United States Patent

Hartmann et al.

(10) Patent No.: US 6,220,158 B1
(45) Date of Patent: Apr. 24, 2001

(54) ROTATION-ANGLE MEASUREMENT FOR PRINTING PRESSES

(75) Inventors: Klaus Hartmann, Schriesheim; Michael Krueger, Edingen-Neckarhausen, both of (DE)

(73) Assignee: Heidelberger Druckmaschinen AG (DE)

( * ) Notice: Subject to any disclaimer, the term of this patent is extended or adjusted under 35 U.S.C. 154(b) by 0 days.

(21) Appl. No.: 09/166,313

(22) Filed: Oct. 5, 1998

(30) Foreign Application Priority Data

Oct. 7, 1997 (DE) .................................. 197 44 159

(51) Int. Cl.[7] .................................................... B41F 13/24
(52) U.S. Cl. ......................... 101/248; 101/484; 250/202; 250/559.29; 250/559.38; 250/559.44
(58) Field of Search ..................... 101/248, 216, 101/212, 181, 182, 183, 184, 483, 484, 485, 486; 250/202, 559.02, 559.05, 559.32, 559.39, 559.4, 559.44, 559.38

(56) References Cited

U.S. PATENT DOCUMENTS

| | | | |
|---|---|---|---|
| 4,220,084 | * | 9/1980 | MacLean et al. ................. 101/248 |
| 4,458,893 | * | 7/1984 | Ruh ..................................... 101/248 |
| 4,547,674 | * | 10/1985 | Pryor et al. ..................... 250/539.38 |
| 4,621,256 | * | 11/1986 | Rusk .................................. 101/248 |
| 4,665,498 | * | 5/1987 | Buschmann et al. ............... 101/184 |
| 4,847,555 | * | 7/1989 | Stammer et al. ................... 324/161 |
| 5,021,781 | * | 6/1991 | Salazar et al. ....................... 341/13 |
| 5,178,070 | * | 1/1993 | Zorn et al. ......................... 101/486 |
| 5,202,842 | | 4/1993 | Suzuki . |
| 5,481,971 | * | 1/1996 | Grützmacher et al. ............. 101/183 |
| 5,551,339 | * | 9/1996 | Schädlich et al. ................. 101/248 |
| 5,615,609 | * | 4/1997 | Hill et al. .......................... 101/183 |
| 5,682,818 | * | 11/1997 | Braun ................................. 101/248 |
| 5,826,505 | * | 10/1998 | Volz et al. .......................... 101/183 |
| 5,900,930 | * | 5/1999 | Simon et al. ...................... 356/138 |
| 5,918,540 | * | 7/1999 | Fischer .............................. 101/484 |
| 5,924,362 | * | 7/1999 | Volv et al. ......................... 101/484 |

FOREIGN PATENT DOCUMENTS

| | | |
|---|---|---|
| 35 35 579 | 5/1986 | (DE) . |
| 90 11 570 U1 | 11/1990 | (DE) . |
| 40 03 453 A1 | 8/1991 | (DE) . |
| 562 608 | 9/1993 | (EP) . |

* cited by examiner

Primary Examiner—Eugene Eickholt
(74) Attorney, Agent, or Firm—Kenyon & Kenyon

(57) ABSTRACT

A rotation-angle measurement for printing presses with at least one marking (2) arranged on a rotating element (1) and at least one sensor (3,4) which detects marking (2). The at least one marking (2) extends along the entire circumferential path (5) and is arranged on the element (1), the position of which is to be determined.

16 Claims, 3 Drawing Sheets

ROTATION-ANGLE MEASUREMENT FOR PRINTING PRESSES

FIELD OF THE INVENTION

The present invention concerns rotation-angle measurement for printing presses with at least one marking arranged on a rotating element and at least one sensor which detects the marking.

RELATED TECHNOLOGY

In printing presses it is often necessary to determine a rotation angle unambiguously and precisely. This is particularly important for various automation functions; by way of example, the plate cylinder must be precisely positioned above the main drive for automatic change of printing plates. For this purpose, position feedback to the printing-press control system concerning the actual rotation angle of the machine is necessary. Up until the present, incremental sensors or similar sensor systems which were mounted on the shafts of certain cylinders were used for this purpose. These sensors have an internal scale which, as a rule, is an optical disk with grid lines. The instantaneous angular position can be determined using light barriers or the like. For reasons of space, it is possible to attach this sensor only where a free shaft end is present. Installation and adjustment are involved processes, and installation errors result in measurement errors. In incremental sensors of this kind, the rotation angle of the element the position of which is to be determined is not determined directly but rather the angular position of the measuring disk assigned to this element is determined. As a result, additional errors occur since the position of the measuring disk is not always in agreement with the position of the element the position of which is to be determined. Such errors are caused by alignment errors, bearing eccentricity, or shaft torsion. In addition, additional errors occur through play, bent gearwheels, etc., resulting in angular displacement between the individual cylinders so that several of these rotation sensors would have to be used for precise determination of position. However, this is not practicable due to the high cost and additional space requirement.

In order to provide simple determination of a rotation angle without a large space requirement, European Patent Application No. 0 562 608 A1 suggests rotation-angle measurement where a marking in the form of a reflecting plate is fixed to a gearwheel and the marking is detected by a sensor. While this type of rotation angle determination is of simple design, continuous measurement is not possible; thus interim values must be determined by a supplemental incremental sensor. This in turn requires precise adjustment of a measuring disk and results in the errors described above.

SUMMARY OF THE INVENTION

An objective of the present invention is to further develop the rotation-angle measurement so as to make a simple device available for continuous and precise rotation-angle measurement.

The present invention provides that at least one marking extends along an entire circumferential path and that such marking is arranged on the element, the position of which is to be determined.

The method according to the present invention has the advantage that the position of the element in question is determined directly. Thus an appropriate marking can be applied to the plate cylinder to determine its position in a direct manner without misalignment of a measuring disk, shaft torsion, or other influences resulting in a measuring disk of this type not indicating the exact angular position of the element which is to be determined. In the example of the plate cylinder, precise determination of the angular position is required, for example, to insert a printing plate which is to be changed automatically precisely into the clamping device.

A further advantage of the method according to the present invention is that the suggested device is constructed in a significantly more simple manner, can be manufactured more cost-effectively, and is very simple to install. Most importantly, it requires almost no additional space, and it is therefore possible to provide rotation-angle measurement of this kind at several points of the printing press. Thus, appropriate rotation-angle measurement can be assigned to each element the rotation angle of which must be precisely determined. It is even possible to install several rotation-angle measurement units to compensate mathematically in this manner for errors.

The marking can be configured in various ways; thus it is possible, for example, for it to be a depression machined into the element or a raised area or another marking which can be detected by a sensor. A marking of this type can in turn be detected by various types of sensors based on various principles of operation. The detection can be optical, or it is possible, for example, to detect depressions or elevations electromagnetically. Such a marking may be configured as a milled sine-wave line which is detected by at least one sensor.

A particularly advantageous further development is for the toothed rim of a gearwheel to serve as a marking. The drive gearwheels of a printing press in particular are parts of particularly high precision, and they must be precisely coordinated with the associated cylinders because they represent the link with the drive and thus to the control system of the printing press. The quality of printing depends on this precision, and it is among the highest levels of precision which is achieved in machine building. For this reason, it is possible to utilize this toothed rim directly for determination of rotation angle in printing presses. This not only makes arranging an additional marking unnecessary, but also reduces the required space since it is only one or several sensors which must be attached. It thus becomes unnecessary to align a marking since the gearwheels are the elements of the printing press that determine the rotation angle. In this way, the indirect approach using a measuring disk is avoided and the associated source of error is eliminated. In addition, by determining the rotation angle directly at the gearwheel, inaccuracies of the gearwheel can be detected at the same time and eliminated by the control system.

It is particularly useful for the at least one sensor to detect a marking on the basis of the change in a magnetic field. For example, the at least one sensor can be a Hall-effect device. In this way, rotation-angle measurement becomes particularly insensitive to contamination which is particularly prevalent in the gear train of a printing press. Special enclosures as needed in the case of disks which must be detected optically are no longer necessary. This simplifies the construction of the device and makes it particularly robust, reliable, and economical. The teeth of a tooth rim in particular are very easily detected in this manner.

In order to detect the direction of rotation in addition to the angular position, it can be provided that at least two sensors are arranged offset viewed in the angle of rotation.

In order to be able to determine the exact angle at every point in time, it is proposed that the circumferential path have at least one marking of a certain width and that the at least one sensor extend as a result of oblong configuration at least partially across this width, the sensor and the marking being configured so that the measured value changes continuously. This is the case, for example, in a milled line which changes in its dimensions or location along the circumferential path. If the toothed rim of a gearwheel serves as marking, it is possible for at least one sensor to extend transversally to the direction of rotation of a helically toothed gearwheel and to be matched to the width of a tooth. With a spur-toothed gearwheel, at least one sensor can extend obliquely to the tooth orientation of the spur-toothed gearwheel and can be matched to the width of a tooth. With embodiments of this type, measurement profiles are generated which can be attributed to the angular position at a given moment through an appropriate metrological evaluation. The measurement profiles can be of any shape, for example sawtooth profiles or sinusoidal profiles. With these kinds of measurement profiles, significantly higher resolutions are achieved than is the case with punctiform measurement locations. It is particularly advantageous if two sensors are arranged offset from each other so that their measurement profiles are out of phase with each other by 90°. In this way, two analog measurement profiles, for example two sine or cosine signals are detected which can be converted, using an appropriate analysis circuit, into a precise angle specification. The precision of this angle specification is so great that tolerances and installation errors of the gearwheel which are relevant for the process can be measured at the same time. In this way, it can even be avoided that such errors interfere with precise positioning, as is necessary, for example, for a change of plates. Determination of these errors in the same process results in the control system compensating for such errors as well.

For accurate measurement of the rotation angle at any time, even at standstill, it is proposed that two sensors measure two circumferential paths the markings of which differ, so that the assignment of two actual values to the two detected measurement profiles allows an unambiguous inference of the instantaneous angular position. This is assured if an identity of location of two measuring points of the measuring profiles occurs a maximum of one time in one rotation.

Rotation-angle measurement can naturally also be made at different gearwheels, or it is possible to arrange several sensors at one gearwheel. It is possible to minimize errors using several detection locations and calculation of a mean value or in the case of detection using several sensors at one gearwheel, it is possible to detect an eccentricity or other errors.

Particularly reliable angle detection is possible through the measurement taking place at two gearwheels, the circular pitches of which do not form an integer multiple. In an arrangement of this type, the condition is met that one unambiguous inference as to the instantaneous angle position is possible from the two measurement profiles detected since the measurement profiles have only one identical position per rotation. If the gearwheels are on different shafts, it is possible that such an identity will occur only after several rotations; however, this also permits a precise determination of the rotation angle.

For minimizing errors, it is further proposed that at least two sensors be located at spatially offset measurement locations which can be on one or on several gearwheels.

If, due to the configuration of the tooth profile, no clean sinusoidal measurement profile occurs, for better determination of the angle it can be provided that at least one sine-wave generator generate an exact sine-wave profile which assists in the determination of rotation angle in that the sine-like profile detected is brought into agreement with the exact sine-wave profile to the greatest extent possible.

BRIEF DESCRIPTION OF THE DRAWINGS

The present invention is explained below using exemplary embodiments which are depicted in the drawings, in which.

DETAILED DESCRIPTION

Figure 1:
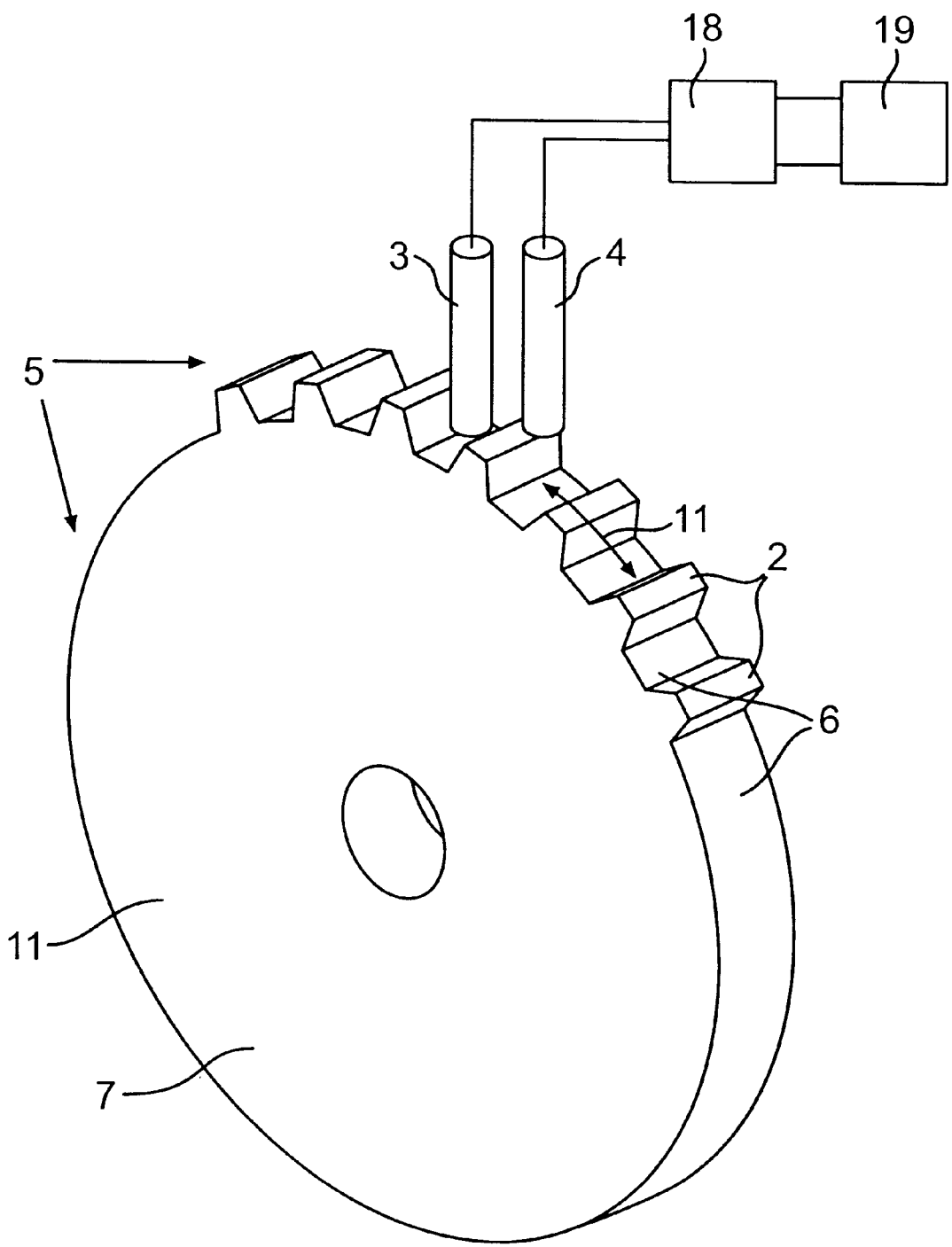
FIG. 1 shows a schematic representation of the rotation-angle measurement.

FIG. 1 is a schematic representation of rotation-angle measurement using a simple exemplary embodiment. On a rotating element 1, the rotation angle of which is to be determined, there is a marking 2 which extends across an entire circumferential path 5. In this exemplary embodiment, marking 2 is the toothed rim 6 of a spur-toothed gearwheel 7. Utilizing such a gearwheel 7 of drive gear train 13 is particularly advantageous since the critical factor in the drive of a printing press is the angular positions of the gearwheels. The gearwheels are in direct, rigid connection with the cylinders and thus together with them represent a rotatable element 1 which must be positioned. Naturally, however, other markings which extend across a circumferential path 5, which could for example be located on the cylinder, could also be used for determination of the rotation angle. In the depicted exemplary embodiment, two sensors 3 and 4 are arranged so as to be offset with respect to direction of rotation 11 of gearwheel 7. Through the arrangement of two sensors 3 and 4, the direction in which gearwheel 7 is rotating can also be determined. A receiver circuit 18 which is connected with control system 19 of the printing press serves for the evaluation of the measurement.

Figure 2:
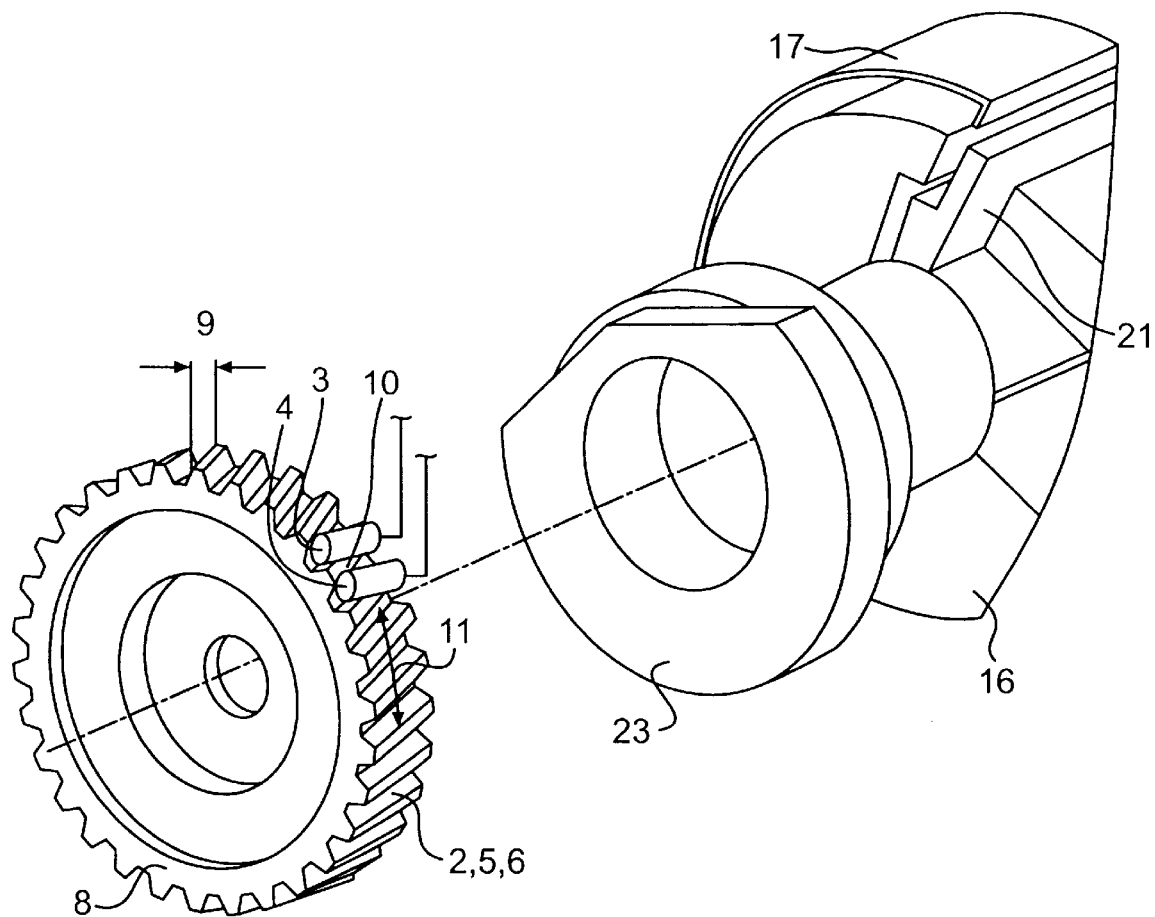
FIG. 2 shows an arrangement of two sensors on the helically toothed gearwheel of a plate cylinder.

FIG. 2 shows an arrangement of two sensors 3 and 4 on helically toothed gearwheel 8 of a plate cylinder 16. For plate cylinders 16, precise positioning is particularly important since they must be inserted precisely into clamping device 21 for the automatic change of printing plates 17. The helically toothed gearwheel has a certain width 9 and sensors 3 and 4 have an oblong configuration 10 which is configured in such a manner that they are matched to the teeth of gearwheel 8 so that measuring profiles 12 or 12' are generated which have a sine-wave shape or an almost sine-wave shape. Gearwheel 8 is firmly joined by a flange 23 to plate cylinder 16.

Figure 3:
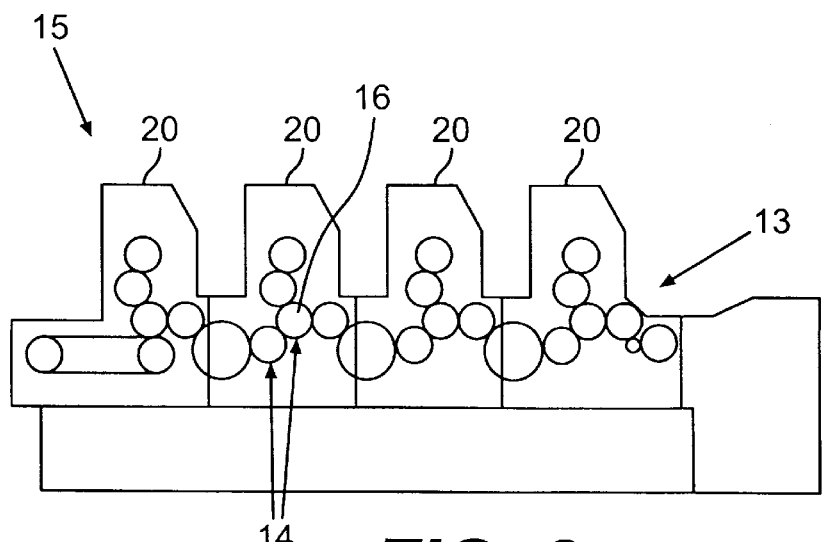
FIG. 3 shows a printing press with drive gear train.
Figure 7:
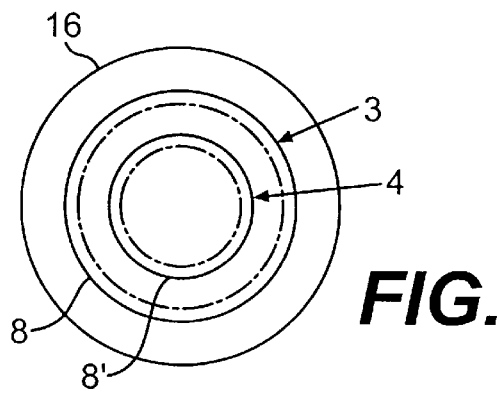
FIG. 7 shows a measurement at two gearwheels.
Figure 8:
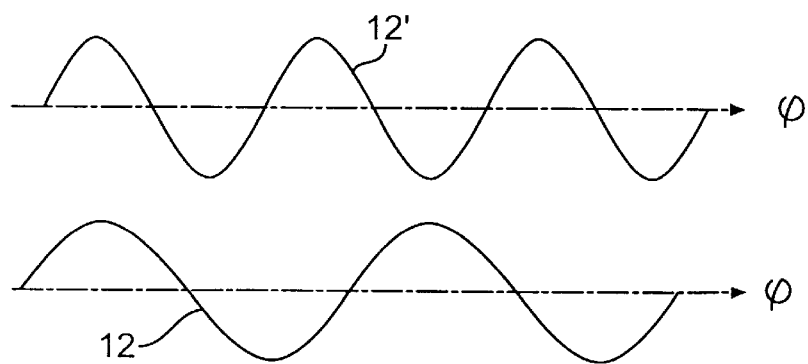
FIG. 8 shows measurement profiles with unambiguous angle attribution.

FIG. 3 shows a printing press 15 with several printing groups 20 and a drive gear train 13. Each printing group 20 has a plate cylinder 16 the positioning of which is especially important during the change of printing plates. In addition, several measurement locations 14 can be provided the measuring locations at different gearwheels making it possible to also detect play, or it is possible, in the event of a reversal of rotation direction when the engaging edges are reversed, to detect the offset caused thereby. Also the fact that as a rule, in the case of plate cylinders 16, two gearwheels 8 and 8' situated on one shaft can be exploited for precise angle determination, whereby an advantageous configuration, such as is explained in greater detail in FIGS. 7 and 8, is possible.

Figure 4:
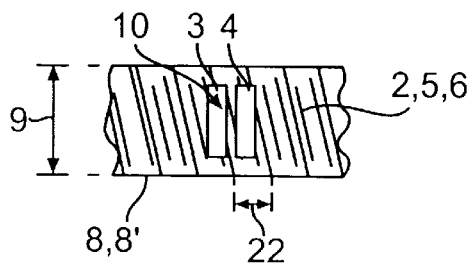
FIG. 4 shows an arrangement of sensors at a helically toothed gearwheel.

FIG. 4 shows an arrangement of sensors 3 and 4 on a helically toothed gearwheel 8 or 8'. This is a top view of toothed rim 6 which serves as marking 2, extends over the entire circumferential path 5, and has a width 9. Sensors 3 and 4 are matched to width 22 of the teeth of gear wheel 8 or 8' so that upon rotation, sine-wave or cosine-wave measurement profiles 12 or 12' are generated.

Figure 5:
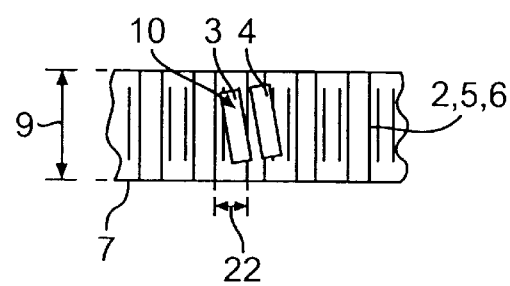
FIG. 5 shows an arrangement of sensors at a spur-toothed gearwheel.

FIG. 5 shows an arrangement of sensors 3 and 4 at a spur-toothed gearwheel, this arrangement likewise serving to produce sine-wave or sinus-like measuring profiles 12 or 12'. For this purpose, sensors 3 and 4 are arranged obliquely to the orientation of the teeth and likewise are matched to width 22 of the teeth so that corresponding measuring profiles are produced.

Figure 6:
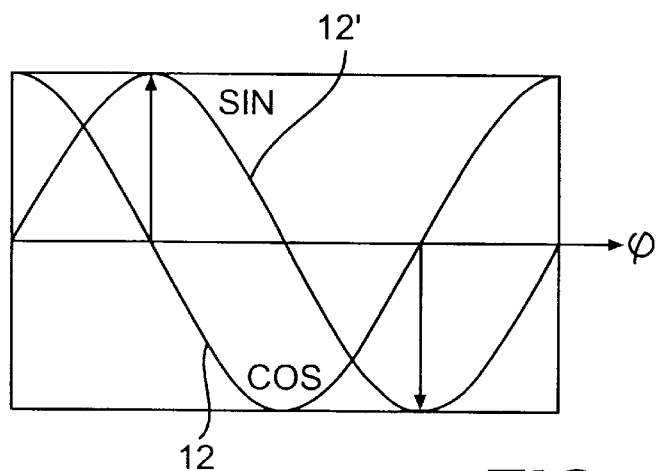
FIG. 6 shows two measurement profiles offset by 90°.

FIG. 6 shows sine-wave measurement profiles 12 and 12' which are offset by 90° and not only serve to determine angular position φ, but rather can also be evaluated with respect to the direction in which the machine is rotating at a given moment.

FIG. 7 shows measurement on two gearwheels 8 and 8' as are present, for example, in plate cylinders 16. Sensors 3 and 4 are assigned to gearwheels 8 and 8', respectively. The circular pitches of these gearwheels 8 and 8' do not represent an integer multiple of each other, which results in the condition being fulfilled that the two measurement profiles 12, 12' have an identity of location only one time per rotation. Therefore at every point in time it is possible to precisely infer the instantaneous angular position φ even when the machine is not moving, which is a great advantage specifically in the case of a positioning procedure. Thus if a certain position must be assumed for automatic change of plates, it is often necessary for the control system to carefully jog the cylinder into the desired position for which purpose very small movements in both directions and measurement at standstill must be possible.

FIG. 8 shows an example of such measurement profiles 12 and 12' which do not have an identical point until a succeeding rotation. The representation is merely a small section; it must be imagined continuing in like manner.

The representations of the drawings are limited to gearwheels, but naturally any measuring profiles can be arranged in this manner and it is possible to determine them optically, electromagnetically, or an other way.

What is claimed is:

1. A measurement device for determining an angular position of a rotating element of a printing press comprising:
   at least one marking arranged on the rotating element; and
   at least one sensor for detecting the at least one marking;
   the at least one marking comprising a toothed rim of a gearwheel extending along an entire circumferential path of the rotating element.

2. The measurement device as recited in claim 1 wherein the at least one marking includes at least one depression machined into the element.

3. The measurement device as recited in claim 1 wherein the at least one sensor detects the at least one marking as a function of a change in a magnetic field.

4. The measurement device as recited in claim 3 wherein the at least one sensor includes a Hall-effect element.

5. A measurement device for determining an angular position of a rotating element of a printing press comprising:
   at least one marking arranged on the rotating element; and
   at least one sensor for detecting the at least one marking;
   wherein the at least one marking extends along an entire circumferential path of the rotating element and the at least one sensor includes two sensors arranged offset with respect to a direction of rotation.

6. The measurement device as recited in claim 1 wherein the circumferential path has a certain width and the at least one sensor as a result of an oblong configuration extends across the certain width, the at least one sensor and the at least one marking being configured in such manner that a value measured by the at least one sensor changes continuously.

7. The measurement device as recited in claim 6 wherein the at least one sensor extends transversally to a direction of rotation of a helically toothed gearwheel and is matched to a width of a tooth.

8. The measurement device as recited in claim 6 wherein the at least one sensor extends diagonally to a tooth orientation of a spur-toothed gearwheel and is matched to a width of a tooth.

9. The measurement device as recited in claim 7 wherein the at least one sensor includes two sensors arranged offset in such a manner that measurement profiles of the two sensors are out of phase by 90°.

10. The measurement device as recited in claim 8 wherein the at least one sensor includes two sensors arranged offset in such a manner that measurement profiles of the two sensors are out of phase by 90°.

11. The measurement device as recited in claim 1 wherein the at least one sensor includes a first sensor for detecting the circumferential path and a second sensor for detecting another circumferential path, the at least one marking including first markings along the circumferential path and second markings along the other circumferential path, the first markings and second markings being different in such manner that two actual values of two measurement profiles can be measured to permit an unambiguous determination of the angular position of the rotating element.

12. The measurement device as recited in claim 11 wherein the circumferential path is on a first gearwheel of a drive gear train and the other circumferential path is on a second gearwheel of the drive gear train.

13. The measurement device as recited in claim 11 wherein measurement of the first and second markings takes place on two gearwheels, the circular pitches of the two gearwheels not forming an integer multiple.

14. A measurement device for determining an angular position of a rotating element of a printing press comprising:
   at least one marking arranged on the rotating element; and
   at least one sensor for detecting the at least one marking;
   wherein the at least one marking extends along an entire circumferential path of the rotating element and the at least one sensor includes at least two sensors situated at spatially offset measurement locations to reduce errors.

15. The measurement device as recited in claim 1 further comprising at least one sine-wave generator for generating an exact sine-wave profile used for determination of the rotation angle in that a detected sine-like profile detected by the at least one sensor is brought into maximum agreement with the exact sine-wave profile.

16. The measurement device as recited in claim 1, wherein the at least one sensor and the at least one marking are configured such that a value measured by the at least one sensor changes continuously.

* * * * *